(12) United States Patent
Li

(10) Patent No.: US 12,182,648 B2
(45) Date of Patent: Dec. 31, 2024

(54) CARD-READING CIRCUIT, CARD READER, AND CARD-READING SYSTEM

(71) Applicant: PAX COMPUTER TECHNOLOGY (SHENZHEN) CO., LTD., Shenzhen (CN)

(72) Inventor: Zexiong Li, Shenzhen (CN)

(73) Assignee: PAX COMPUTER TECHNOLOGY (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 18/684,908

(22) PCT Filed: Jul. 11, 2022

(86) PCT No.: PCT/CN2022/104792
§ 371 (c)(1),
(2) Date: Feb. 20, 2024

(87) PCT Pub. No.: WO2023/029754
PCT Pub. Date: Mar. 9, 2023

(65) Prior Publication Data
US 2024/0346260 A1    Oct. 17, 2024

(30) Foreign Application Priority Data
Aug. 30, 2021    (CN) .......................... 202111004892.9

(51) Int. Cl.
*G06K 7/00*    (2006.01)
(52) U.S. Cl.
CPC ................... *G06K 7/0047* (2013.01)

(58) Field of Classification Search
CPC ...................................................... G06K 7/0047
USPC .......................................................... 235/441
See application file for complete search history.

(56) References Cited

U.S. PATENT DOCUMENTS

| 5,679,942 A | 10/1997 | Toyama | |
|---|---|---|---|
| 2008/0022123 A1* | 1/2008 | Yoneda | G07F 7/0886 713/185 |
| 2015/0310233 A1* | 10/2015 | Kwak | G06K 7/0004 235/440 |

(Continued)

*Primary Examiner* — Allyson N Trail
(74) *Attorney, Agent, or Firm* — ScienBiziP, P.C.

(57) ABSTRACT

The present application belongs to the technical field of circuits. Disclosed are a card-reading circuit, a card reader, and a card-reading system. The card-reading circuit comprises a connection module and a communication control module. The connection module comprises a first connection unit and a second connection unit, and the communication control module comprises a first communication control unit and a second communication control unit. The first communication control unit is connected between a second end of the first connection unit and a reading end of a central processing unit, and the second communication control unit is connected between a second end of the second connection unit and the reading end of the central processing unit. At the same moment, one of the first communication control unit and the second communication control unit is operating. A card reader used by the card-reading circuit can realize the double-sided card reading of an integrated circuit card which is made of a metal material.

20 Claims, 6 Drawing Sheets

(56) References Cited

U.S. PATENT DOCUMENTS

| | | | | |
|---|---|---|---|---|
| 2016/0148023 | A1* | 5/2016 | Lamfalusi | G06Q 20/20 235/440 |
| 2019/0163938 | A1* | 5/2019 | Kitazawa | G06K 7/087 |
| 2021/0279540 | A1* | 9/2021 | Lloyd | H04B 5/72 |
| 2024/0289583 | A1* | 8/2024 | Gajanan | G07F 7/0893 |
| 2024/0346260 | A1* | 10/2024 | Li | G06K 7/0047 |

* cited by examiner

CARD-READING CIRCUIT, CARD READER, AND CARD-READING SYSTEM

CROSS-REFERENCE TO RELATED APPLICATIONS

This application claims priority to China Application No. 202111004892.9 filed on Aug. 30, 2021, in the China National Intellectual Property Administration, the contents of which are incorporated by reference herein.

TECHNICAL FIELD

The present disclosure relates to circuit technology field, in particular to a card-reading circuit, a card reader, and a card-reading system.

BACKGROUND

An integrated circuit card (Smart Card) includes a card and an integrated circuit (IC) chip provided on a surface of the card. Wherein, the card can be made of metal or plastic, and the integrated circuit chip can be a memory used to store information. A card reader refers to a device that has a card slot for inserting an integrated circuit card and is connected to a central processing unit (CPU) to enable the CPU to read the integrated circuit card inserted into the card slot. In the related art, the card slot is formed by clamping a first board surface and a second board surface. A card-reading circuit of the card reader includes a first connection unit and a second connection unit. A first end of the first connection unit and a first end of the second connection unit each include a plurality of terminals. The first end of the first connection unit is located on the first board surface, the first end of the second connection unit is located on the second board surface. A second end of the first connection unit and a second end of the second connection unit are both used for connecting with the CPU. Thus, when the card of the integrated circuit card made of plastic material is inserted into the card slot, if the integrated circuit chip is attached to the first board surface, the CPU reads the integrated circuit chip through the first connection unit; if the integrated circuit chip is attached to the second board surface, the CPU reads the integrated circuit chip through the second connection unit. This type of card reader is called a double-sided card reader.

However, after the integrated circuit card is inserted into the card slot, if the integrated circuit chip is attached to the first board surface, the card will be attached to the second board surface. In this case, if the card is made of metal, the plurality of terminals of the first end of the second connection unit will be short-circuited due to the connection of the metal card, causing a short circuit between the plurality of terminals of the first end of the first connection unit. Therefore, the double-sided card reader in the related art cannot be applied to the integrated circuit card whose card is made of metal material.

SUMMARY OF THE INVENTION

The application provides a card-reading circuit, a card reader, and a card-reading system, which may perform double-sided card reading on the integrated circuit card whose card is made of metal material. Technical solutions are as follows:

On a first aspect of the application, providing a card-reading circuit including: a connection module and a communication control module;

the connection module includes a first connection unit and a second connection unit, a first end of the first connection unit and a first end of the second connection unit both configured to connect to an integrated circuit chip of an integrated circuit card;

the communication control module includes a first communication control unit and a second communication control unit, a first end of the first communication control unit connected to a second end of the first connection unit, a first end of the second communication control unit connected to a second end of the second connection unit, a second end of the first communication control unit and a second end of the second communication control unit both connect to a reading end of a central processing unit (CPU), when the first communication control unit is working, the CPU reading the integrated circuit chip through the first connection unit, or when the second communication control unit is working, the CPU reads the integrated circuit chip through the second connection unit; wherein, at the same moment, one of the first communication control unit and the second communication control unit works.

In the present application, the card-reading circuit including the connection module and the communication control module. The connection module includes a first connection unit and a second connection unit. The first communication control unit is connected between the second end of the first connection unit and the reading end of the CPU, the second communication control unit is connected between the second end of the second connection unit and the reading end of the CPU. At the same time, one of the first communication control unit and the second communication control unit is working. Thus, when the first communication control unit works and the CPU reads the integrated circuit chip through the first connection unit, since the second communication control unit does not work, the card is disconnected from the reading end of the CPU. In this case, even if the card is made of metal material, the metal card will not cause a short circuit between the terminals of the first end of the first connection unit. On the contrary, when the second communication control unit works and the CPU reads the integrated circuit chip through the second connection unit, since the first communication control unit does not work, the card is disconnected from the reading end of the CPU. In this case, even if the card is made of metal material, the metal card will not cause a short circuit between the terminals of the first end of the second connection unit. Thus, the card reader used in the card-reading circuit can realize double-sided card reading of the integrated circuit card whose card is made of plastic material, and also realize double-sided card reading of the integrated circuit card whose card is made of metal material.

Optionally, the first communication control unit includes a first switch, the second communication control unit includes a second switch, a first end of the first switch is connected to the second end of the first connection unit, a first end of the second switch is connected to the second end of the second connection unit, a second end of the first switch and a second end of the second switch are both connected to the reading end of the CPU; wherein, at the same moment, one of the first switch and the second switch is turned on.

Optionally, the communication control module further includes: a card-reading processor;

a first end of the card-reading processor is connected to the second end of the first switch and the second end of the second switch, a second end of the card-reading processor is connected to the reading end of the CPU, the card-reading processor is configured to communicate with the integrated circuit chip after receiving a reading signal outputted by the reading end of the CPU, obtain a communication signal and output the communication signal to the reading end of the CPU.

Optionally, the card-reading circuit further includes a detection module;

the detection module is configured to generate an insertion detection signal upon contacting with a card of the integrated circuit card, the detection module is connected to an input end of the card-reading processor to transmit the insertion detection signal to the card-reading processor;

the card-reading processor is configured to transmit an instruction signal to the CPU when receiving the insertion detection signal, the instruction signal is configured to instruct the CPU to output a first level signal or a second level signal, the first level signal is configured to control the first switch to be turned on and the second switch to be turned off, and the second level signal is configured to control the first switch to be turned off and the second switch to be turned on.

Optionally, the first communication control unit includes a first card-reading processor, and the second communication control unit includes a second card-reading processor;

a first end of the first card-reading processor is connected to the second end of the first connection unit, a first end of the second card-reading processor is connected to the second end of the second connection unit, a second end of the first card-reading processor and a second end of the second card-reading processor are both connected to the reading end of the CPU; at the same time, one of the first card-reading processor and the second card-reading processor is working.

Optionally, the card-reading circuit further includes a detection module;

the detection module is configured to generate the insertion detection signal upon contacting with the card of the integrated circuit card, the detection module is connected to an input end of the first card-reading processor and an input end of the second card-reading processor to transmit the insertion detection signal to the first card-reading processor and the second card-reading processor;

the first card-reading processor and the second card-reading processor are both configured to transmit an indication signal to the CPU when receiving the insertion detection signal, and the indication signal is configured to instruct the CPU to output a first level signal or a second level signal, the first level signal is configured to control the first card-reading processor to work and control the second card-reading processor not to work; the second level signal is configured to control the first card-reading processor not to work and to control the second card-reading processor to work.

Optionally, the card-reading circuit further includes a level conversion module;

a first end of the level conversion module is connected to an output end of the CPU, and the output end of the CPU is connected to a control end of the first card-reading processor, a second end of the level conversion module is connected to a control end of the second card-reading processor, a third end of the level conversion module is connected to a power source, a fourth end of the level conversion module is connected to a ground wire;

when the first end of the level conversion module is inputted with the first level signal, the second end of the level conversion module outputs the second level signal; when the first end of the level conversion module is inputted with the second level signal, the second end of the level conversion module outputs the first level signal.

Optionally, the level conversion module includes: a first resistor, a second resistor, and a first transistor;

a first end of the first resistor is connected to the output end of the CPU, a second end of the first resistor is connected to a base of the first transistor;

a first end of the second resistor is connected to the power source, a second end of the second resistor is connected to the control end of the second card-reader processor and a collector of the first transistor;

an emitter of the first transistor is connected to the ground wire.

On a second aspect of the application, providing a card holder and the card-reading circuit according to the first aspect;

the card holder includes a first board surface and a second board surface, the first board surface and the second board surface clamp to form a card slot for inserting the integrated circuit card, the first end of the first connection unit is located on the first board surface, and the first end of the second connection unit is located on the second board surface, so that when the integrated circuit card is inserted into the card slot, the integrated circuit chip of the integrated circuit card is connected to the first end of the first connection unit or the first end of the second connection unit.

On a third aspect of the application, providing a central processing unit (CPU) and the card-reading circuit according to the first aspect;

the CPU is configured to: output the first level signal to the control end of the first communication control unit and the control end of the second communication control unit to control one of the first communication control unit and the second communication control unit to work; if the CPU does not read the integrated circuit chip within a preset time period after outputting the first level signal, outputting the second level signal to the control end of the first communication control unit and the control end of the second communication control unit, to control the other one of the first communication control unit and the second communication control unit to work.

It can be understood that the beneficial effects of the above-mentioned second and third aspects can be referred to the relevant descriptions in the above-mentioned first aspect, and will not be described again here.

BRIEF DESCRIPTION OF THE DRAWINGS

In order to more clearly illustrate the technical solutions in the embodiments of the application, the drawings needed to be used in the description of the embodiments will be briefly introduced below. Obviously, the drawings in the following description are only some embodiments of the application, for those of ordinary skill in the art, other drawings can also be obtained based on these drawings without exerting creative efforts.

Wherein, the meanings represented by each drawing symbol are:

| | |
|---|---|
| integrated circuit card | 10 |
| card | 12 |
| integrated circuit chip | 14 |
| card reader (in the related art) | 20 |
| holder (in the related art) | 201 |
| slot (in the related art) | 202 |
| first board surface (in the related art) | 210 |
| second board surface (in the related art) | 220 |
| card-reading circuit | 30 |
| connection module | 310 |
| first connection unit | 312 |
| second connection unit | 314 |
| communication control module | 320 |
| first communication control unit | 322 |
| second communication control unit | 324 |
| card-reading processor | 326 |
| detection module | 330 |
| level conversion module | 340 |
| card reader | 340 |
| slot | 402 |
| first board surface | 410 |
| second board surface | 420 |
| CPU | 52 |

DETAILED DESCRIPTION

The following description is used to disclose the present disclosure so that those skilled in the art can implement the present disclosure. The preferred embodiments in the following description are only examples, and those skilled in the art can think of other obvious variations. The basic principles of the present disclosure defined in the following description can be applied to other embodiments, modifications, improvements, equivalents, and other technical solutions that do not depart from the spirit and scope of the present disclosure.

Those skilled in the art should understand that, the "plurality" mentioned in this application means two or more. In the description of this application, unless otherwise stated, "/" means or, for example, A/B can mean A or B; "And/or" in this article is just an association relationship that describes related objects, indicating that there can be three relationships, for example, A and/or B can mean: A exists alone, A and B exist simultaneously, and B exists alone, these three situations. In addition, in order to facilitate a clear description of the technical solution of the present application, words such as "first" and "second" are used to distinguish identical or similar items with basically the same functions and effects. Those skilled in the art can understand that words such as "first" and "second" do not limit the number and execution order, and words such as "first" and "second" do not limit the number and execution order.

Before explaining the embodiments of the present application in detail, the application scenarios of the embodiments of the present application will be described first.

Figure 1:
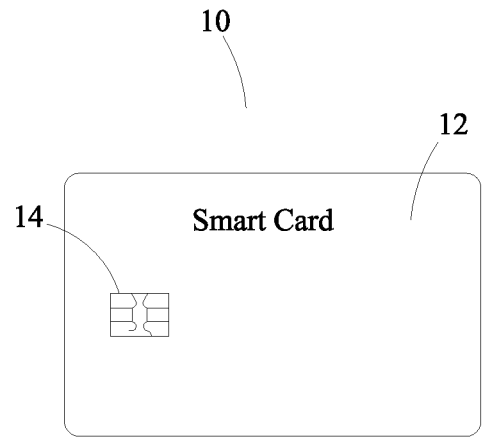
FIG. 1 is a structural schematic diagram of an integrated circuit card in the related art.

FIG. 1 is a structural schematic diagram of an integrated circuit card in the related art. As shown in FIG. 1, an integrated circuit card 10 (Smart Card) includes a card 12 and an integrated circuit (IC) chip 14 provided on a surface of the card 12. Wherein, the card 12 can be made of metal or plastic, and the integrated circuit chip 14 can be a memory used to store information.

Figure 2:
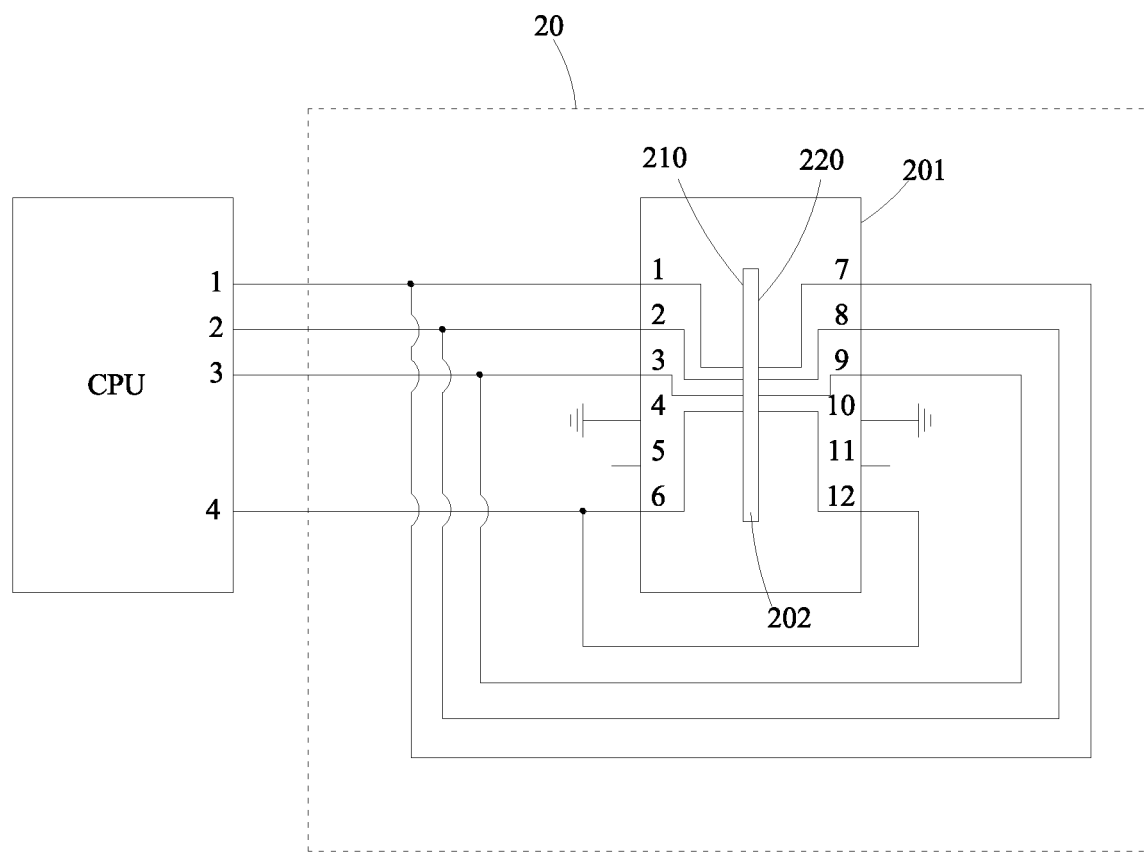
FIG. 2 is a structural schematic diagram of a card reader in the related art.

FIG. 2 is a structural schematic diagram of a card reader 20 in the related art. As shown in FIG. 2, the card reader 20 is used to connect to a central processing unit (CPU) to enable the CPU to read the integrated circuit card 10. The card reader 20 includes a card holder 201, the card holder 201 has a card slot 202 for inserting the integrated circuit card 10. The card slot 202 is formed by clamping a first board surface 210 and a second board surface 220. A card-reading circuit of the card reader 20 includes a first connection unit and a second connection unit. The first connection unit includes a wire connected between pin 1 of the card holder 201 and pin 1 of the CPU, a wire connected between pin 2 of the card holder 201 and pin 2 of the CPU, and a wire connected between pin 3 of the card holder 201 and pin 3 of the CPU, and a wire connected between pin 6 of the card holder 201 and pin 4 of the CPU. The second connection unit includes a wire connected between pin 7 of the card holder 201 and pin 1 of the CPU, a wire connected between pin 8 of the card holder 201 and pin 2 of the CPU, a wire connected between pin 9 of the card holder 201 and pin 3 of the CPU, and a wire connected between pin 12 of the card holder 201 and pin 4 of the CPU. That is, a first end and a second end of the first connection unit and a first end and a second end of the second connection unit each include a plurality of terminals. The plurality of terminals of the first end of the first connection unit are located on the first board surface 210, the plurality of terminals of the second end of the first connection unit are used to connect to the CPU. The plurality of terminals of the first end of the second connection unit are located on the second board surface 220, the plurality of terminals of the second end of the second connection unit are used to connect to the CPU. Thus, when the card 12 of the integrated circuit card 10 made of plastic material is inserted into the card slot 202, if the integrated circuit chip 14 is attached to the first board surface 210, the CPU reads the integrated circuit chip 14 through the first connection unit between the first board surface 210 and the CPU; if the integrated circuit chip 14 is attached to the second board surface 220, the CPU reads the integrated circuit chip 14 through the second connection unit between the second board surface 220 and the CPU. This type of card reader 20 is called a double-sided card reader 20.

However, if the card 12 is made of metal material, after the integrated circuit card 10 is inserted into the card slot 202, when the integrated circuit chip 14 is attached to the first board surface 210 and the card 12 is attached to the second board surface 220, the plurality of terminals of the first end of the second connection unit will be short-circuited due to the connection of the metal card 12. That is, pin 7, pin 8, pin 9, and pin 12 of the card holder 201 will be connected through the card 12, which may cause pin 1, pin 2, pin 3, and pin 6 of the card holder 201 being connected through the card 12, that is causing a short circuit between the plurality of terminals of the first end of the first connection unit, the CPU cannot read the integrated circuit chip 14 at this time. Similarly, when the integrated circuit chip 14 is attached to the second board surface 220 and the card 12 is attached to the second board surface 220, the CPU cannot read the integrated circuit chip 14 neither. Therefore, the double-sided card reader 20 in the related art cannot be applied to the integrated circuit card 10 whose card 12 is made of metal material.

Thus, the application provides a card-reading circuit, a card reader, and a card-reading system, which may perform double-sided card reading on the integrated circuit card 10 whose card 12 is made of metal.

The card-reading circuit, the card reader, and the card-reading system provided by the embodiment of the present application will be explained in detail below.

Figure 3:
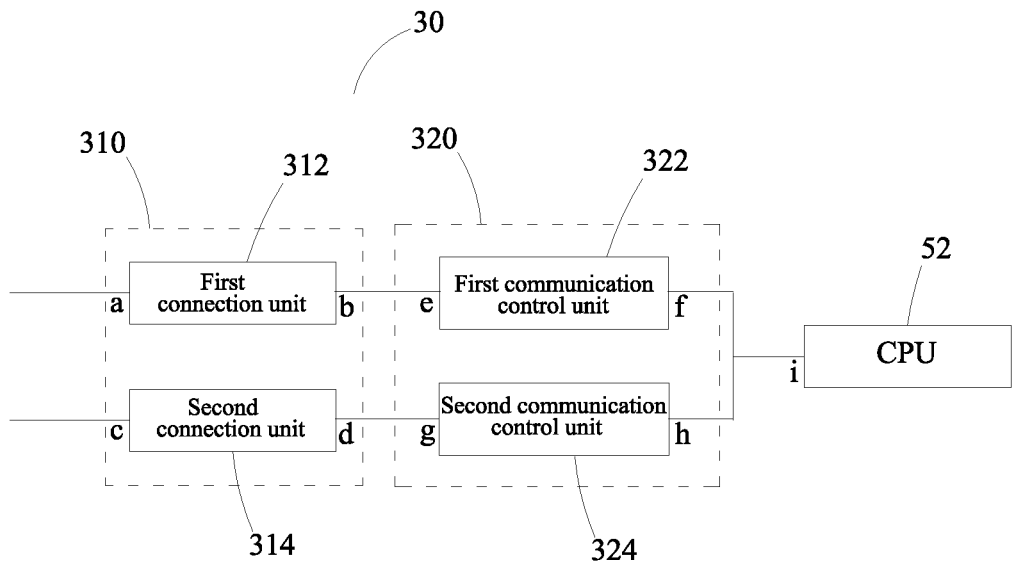
FIG. 3 is a structural schematic diagram of a first card-reading circuit according to the embodiment of the application.

FIG. 3 is a structural schematic diagram of a first card-reading circuit 30 according to the embodiment of the application. As shown in FIG. 3, the card-reading circuit 30 includes a connection module 310 and a communication control module 320.

In detail, the connection module 310 includes a first connection unit 312 and a second connection unit 314. As in the related art, both the first connection unit 312 and the second connection unit 314 may be wire groups used to connect to the integrated circuit chip 14. That is, the first connection unit 312 may include a plurality of wires and the second connection unit 314 may include a plurality of wires. For convenience of description, all ends of the plurality of wires of the first connection unit 312 that are used to connect to the integrated circuit chip 14 are collectively referred to as a first end a of the first connection unit 312; all the other ends of the plurality of wires of the first connection unit 312 are collectively referred to as a second end b of the first connection unit 312. That is, the first end a of the first connection unit 312 is used to connect to the integrated circuit chip 14. Similarly, all ends of the plurality of wires of the second connection unit 314 that are used to connect to the integrated circuit chip 14 are collectively referred to as a first end c of the second connection unit 314; all the other ends of the plurality of wires of the second connection unit 314 are collectively referred to as a second end d of the second connection unit 314. That is, the first end c of the second connection unit 314 is used to connect to the integrated circuit chip 14.

The communication control module 320 includes a first communication control unit 322 and a second communication control unit 324. The first communication control unit 322 includes a first end e and a second end f. The first end e of the first communication control unit 322 is connected to the second end b of the first connection unit 312, the second end f of the first communication control unit 322 is used to connect to a reading end i of the CPU 52. The second communication control unit 324 includes a first end g and a second end h. The first end g of the second communication control unit 324 is connected to the second end d of the second connection unit 314, the second end h of the second communication control unit 324 is used to connect to the reading end i of the CPU 52.

At the same time, one of the first communication control unit 322 and the second communication control unit 324 works. Thus, when the first communication control unit 322 is working, the integrated circuit chip 14 is connected to the reading end i of the CPU 52 through the first connection unit 312 and the first communication control unit 322, and the CPU 52 can read the integrated circuit chip 14 through the first connection unit 312. At this time, the second communication control unit 324 does not work. In this case, even if the card 12 is made of metal material, the plurality of terminals of the first end c of the second connection unit 314 are connected together through the card 12 to form a short circuit, which will not cause the plurality of terminals of the first end a of the first connection unit 312 to be short-circuited. Similarly, when the second communication control unit 324 is working, the integrated circuit chip 14 is connected to the reading end i of the CPU 52 through the second connection unit 314 and the second communication control unit 324, and the CPU 52 can read the integrated circuit chip 14 through the second connection unit 314. At this time, the first communication control unit 322 does not work. In this case, even if the card 12 is made of metal material, the plurality of terminals of the first end a of the first connection unit 312 are connected together through the card 12 to form a short circuit, which will not cause the plurality of terminals of the first end c of the second connection unit 314 to be short-circuited. Thus, when the card reader 40 used in the card-reading circuit 30 can perform double-sided reading on the integrated circuit card 10 whose card 12 is made of plastic material, it can also perform double-sided reading on the integrated circuit card 10 whose card 12 is made of metal material.

The embodiment of the present application also provides a card reader 40, which includes a card holder and the card-reading circuit 30 of the above embodiment.

In the present application, the communication control module 320 of the card-reading circuit 30 has two different implementation methods. The following is a description of two different implementation methods of the communication control module 320 of the card-reading circuit 30 and the card reader 40 using the card-reading circuit 30 in detail.

Figure 4:
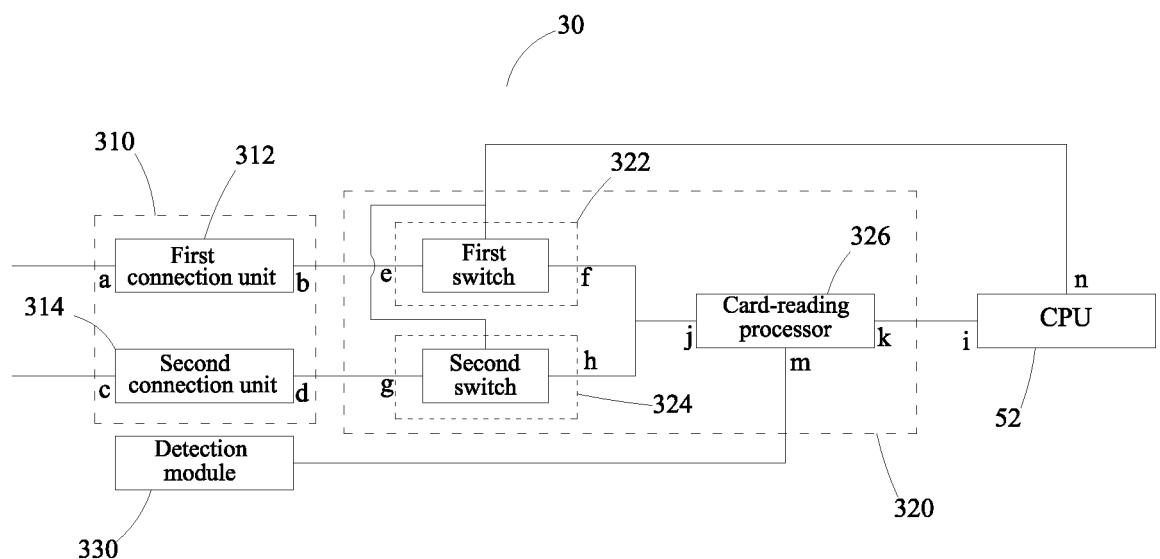
FIG. 4 is a structural schematic diagram of a second card-reading circuit according to the embodiment of the application.
Figure 5:
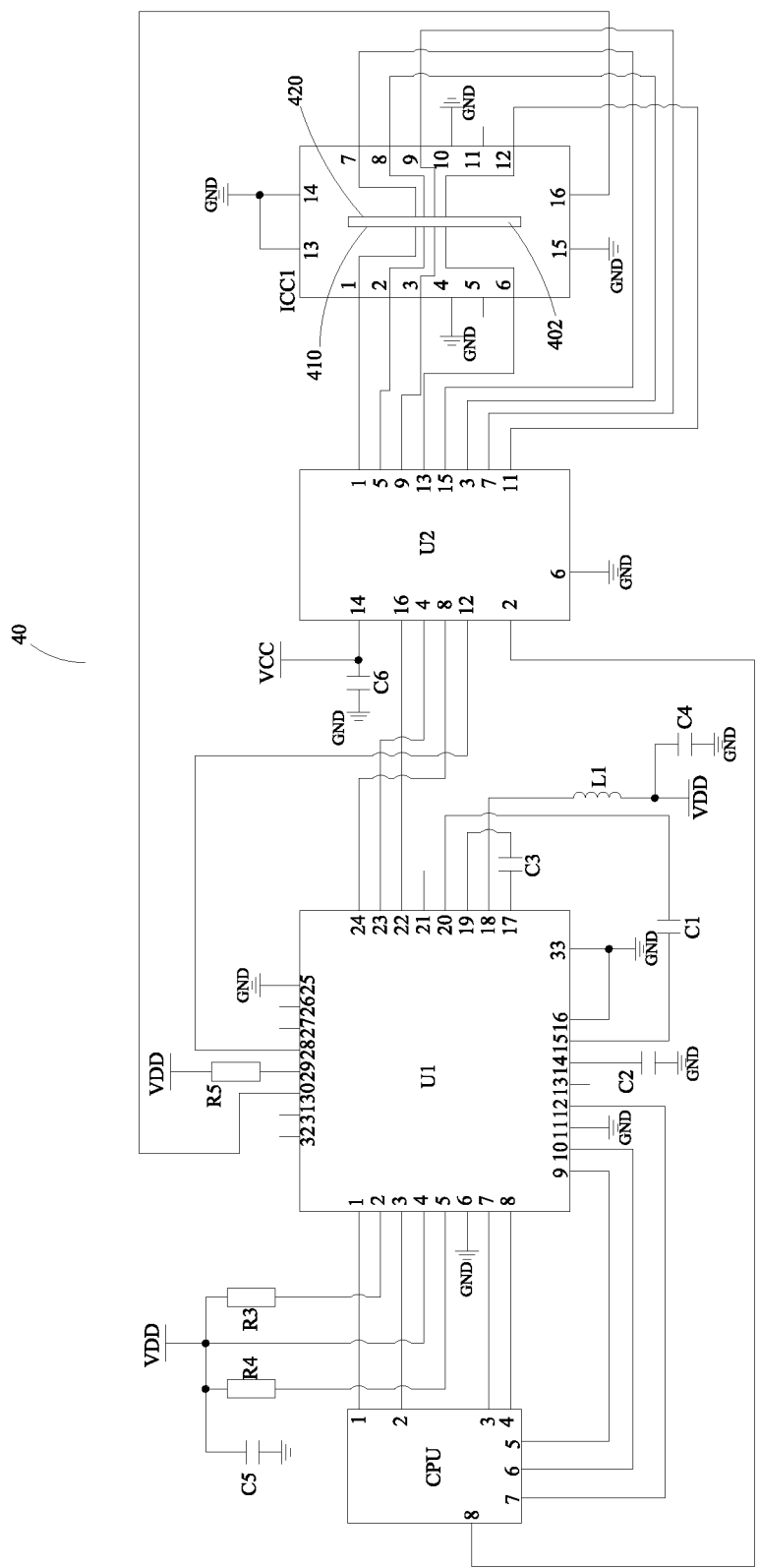
FIG. 5 is a structural schematic diagram of a first card reader according to the embodiment of the application.

In a first possible implementation:

In some embodiments, as shown in FIG. 4, the first communication control unit 322 may include a first switch, the second communication control unit 324 may include a second switch. A first end of the first switch is the first end e of the first communication control unit 322 and used to connect to the second end b of the first connection unit 312. A second end of the first switch is the second end f of the first communication control unit 322 and used to connect to the reading end i of the CPU 52. A first end of the second switch is the first end g of the second communication control unit 324 and used to connect to the second end d of the second connection unit 314. A second end of the second switch is the second end h of the second communication control unit 324 and used to connect to the reading end i of the CPU 52.

As known from the above description, the first connection unit 312 may be a plurality of wires, and the second end b of the first connection unit 312 may include a plurality of terminals. The reading end i of the CPU 52 is used to connect to the second end of the first connection unit 312, the reading end i of the CPU 52 may also include a plurality of terminals. Thus, the first switch connected between the second end b of the first connection unit 312 and the reading end i of the CPU 52 may be a switch group, and the switch group may include a plurality of switches that can be turned on or off at the same time. Similarly, the second switch connected between the second end d of the second connection unit 314 and the reading end i of the CPU 52 can also be a switch group, and the switch group can also include a plurality of switches that can be turned on or off at the same time. At the same time, a specific performance of the work of one of the first communication control unit 322 and the second communication control unit 324 is: at the same time, one of the first switch and the second switch is turned on.

In one embodiment, as shown in FIG. 4, the communication control module 320 may further include a card-reading processor 326.

The card-reading processor 326 includes a first end j and a second end k. The first end j of the card-reading processor 326 is connected to the second end of the first switch and the second end of the second switch, that is the first end j of the card-reading processor 326 is connected to the second end f of the first communication control unit 322 and the second end h of the second communication control unit 324. The second end k of the card-reading processor 326 is used to connect to the reading end i of the CPU 52. When the card-reading circuit 30 is working, the reading end i of the CPU 52 outputs a reading signal to the second end k of the card-reading processor 326. After the card-reading processor 326 receives the reading signal, if the first switch is turned on, the first end j of the card-reading processor 326 communicates with the integrated circuit chip 14 through the first connection unit 312, so that the card-reading processor 326 obtains a communication signal. After the card-reading processor 326 receives the reading signal, if the second switch is turned on, the first end j of the card-reading processor 326 communicates with the integrated circuit chip 14 through the second connection unit 314, so that the card-reading processor 326 obtains the communication signal. The card-reading processor 326 may output the communication signal to the reading end i of the CPU 52. The CPU 52 achieves a purpose of reading the integrated circuit chip 14 by reading the communication signal.

In some embodiments, as shown in FIG. 4, the card-reading circuit 30 includes: a detection module 330.

The detection module 330 is used to generate an insertion detection signal upon contacting with the card 12 of the integrated circuit card 10. In some specific embodiments, the detection module 330 may be a charged metal conductor. Thus, when the card 12 contacts with the detection module 330, an amount of charge on the detection module 330 will change. The change of the amount of charge can be the insertion detection signal. In another specific embodiment, the detection module 330 may be a physical switch. Thus, when the card 12 contacts with the detection module 330, the physical switch is triggered to close, thereby generating an electrical signal in the detection module 330. The electrical signal may be the insertion detection signal.

The detection module 330 is connected to an input end m of the card-reading processor 326, so that after the insertion detection signal is generated, the insertion detection signal is transmitted to the card-reading processor 326. The card-reading processor 326 is used to transmit an instruction signal to the CPU 52 when receiving the insertion detection signal. The instruction signal is used to instruct the CPU 52 to output a first level signal or a second level signal through an output end n. The first level signal is used to control the first switch to be turned on and the second switch to be turned off, that is, to control the first communication control unit 322 to work and to control the second communication control unit 324 not to work. The second level signal is used to control the first switch to be turned off and the second switch to be turned on, that is, to control the first communication control unit 322 to not work and to control the second communication control unit 324 to work.

Figure 8:
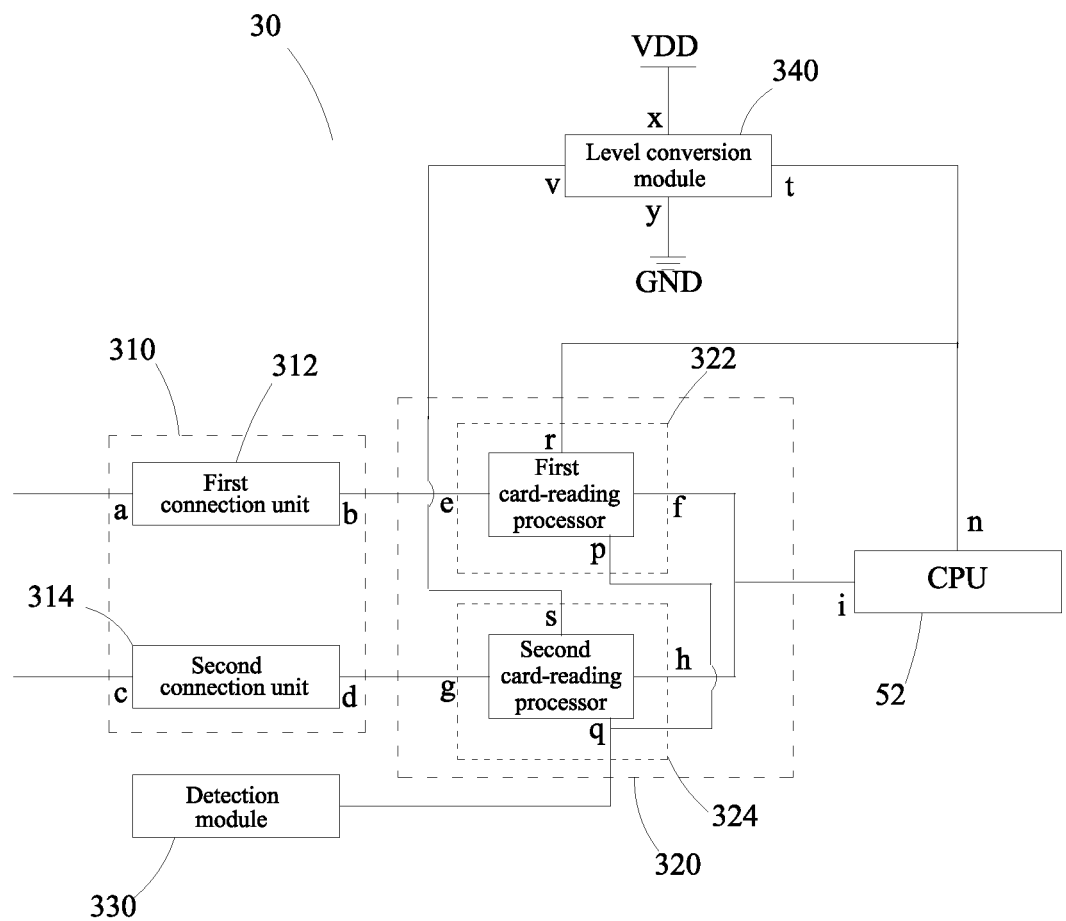
FIG. 8 is a structural schematic diagram of a fifth card-reading circuit according to the embodiment of the application.

In some embodiments, as shown in FIG. 8, the card-reading circuit 30 further includes: a level conversion module 340.

The level conversion module 340 includes a first end t, a second end v, a third end x, and a fourth end y. The first end t of the level conversion module 340 is used to connect to the output end n of the CPU 52, and the output end n of the CPU 52 is connected to a control end r of a first card-reading processor, the second end v of the level conversion module 340 is connected to a control end s of a second card-reading processor, the third end x of the level conversion module 340 is connected to a power source VDD, the fourth end y of the level conversion module 340 is connected to a ground wire GND. When the first end t of the level conversion module 340 is inputted with the first level signal, the second end v of the level conversion module 340 outputs the second level signal; when the first end t of the level conversion module 340 is inputted with the second level signal, the second end v of the level conversion module 340 outputs the first level signal. The first level signal may be one of a high level signal and a low level signal, and the second level signal may be the other of the high level signal and the low level signal.

Figure 6:
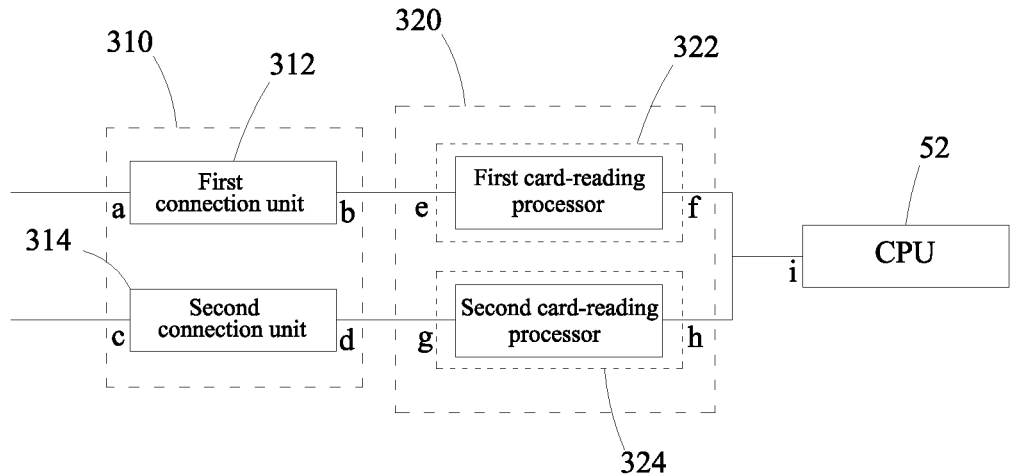
FIG. 6 is a structural schematic diagram of a third card-reading circuit according to the embodiment of the application.
Figure 7:
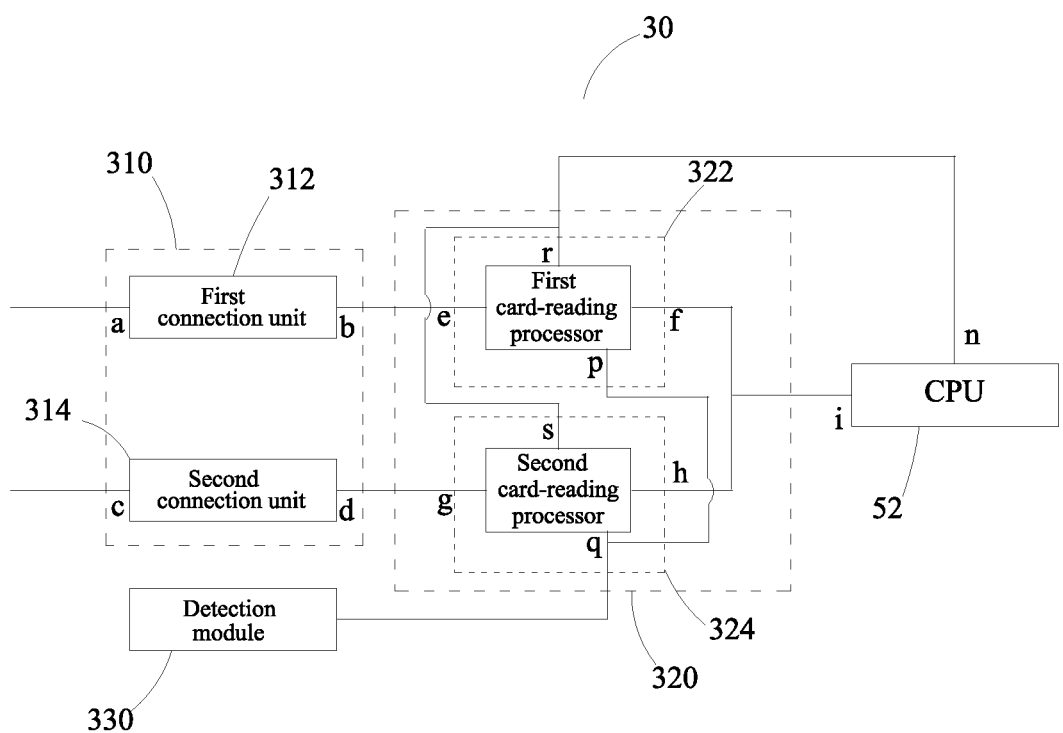
FIG. 7 is a structural schematic diagram of a fourth card-reading circuit according to the embodiment of the application.
Figure 9:
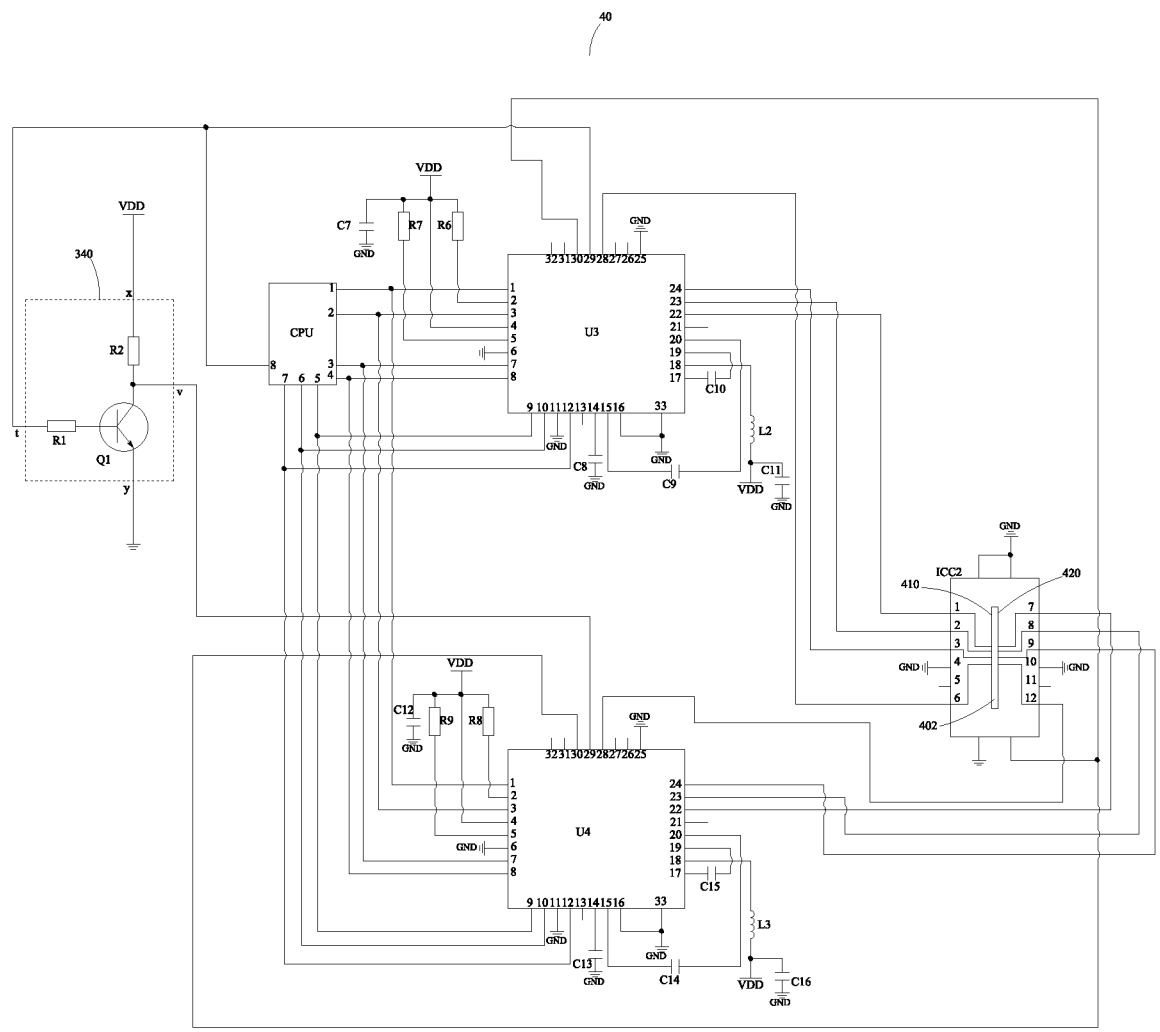
FIG. 9 is a structural schematic diagram of a second card reader according to the embodiment of the application.

FIG. 9 is a schematic structural diagram of another card reader 40 provided by an embodiment of the present application. In the embodiment shown in FIG. 6, a second possible implementation manner of the communication control module 320 of the card-reading circuit 30 is shown, and a card holder is shown.

First, each physical device in FIG. 9 is introduced:

In the embodiment shown in FIG. 9, ICC2 is a card holder, which includes the connection module 310 and the detection module 330. A structure of the card holder ICC2 is the same as the card holder ICC1. A chip U3 is the first card-reading processor, and a chip U4 is the second card-reading processor. A structure of the chip U3 and a structure of the chip U4 are the same as the structure of the chip U1.

The card holder ICC2 includes a total of 16 pins. Wherein, a wire connected between pin 1 of the card holder ICC2 and pin 22 of the chip U3, a wire connected between pin 2 of the card holder ICC2 and pin 23 of the chip U3, a wire connected between pin 3 of the card holder ICC2 and pin 24 of the chip U3, and a wire connected between pin 6 of card holder ICC2 and pin 28 of the chip U3 together form the first connection unit 312. A wire connected between pin 7 of the card holder ICC2 and pin 22 of the chip U4, a wire connected between pin 8 of the card holder ICC2 and pin 23 of the chip U4, a wire connected between pin 9 of the card holder ICC2 and pin 24 of the chip U4, and a wire connected between pin 12 of the card holder ICC2 and pin 28 of the chip U4 together form the second connection unit 314. Pin 5 and pin 11 of the card holder ICC2 are empty. Pin 4, pin 10, pin 13, pin 14, and pin 15 of the card holder ICC2 are connected to the ground wire GND. Pin 16 of the card holder ICC2 is the detection module 330, which is used to output the insertion detection signal.

The chip U3 is the first card-reading processor. Wherein, pin 1, pin 3, pin 7, pin 8, pin 9, pin 10, and pin 12 of the chip U3 are the second end of the first card-reading processor and are used to connect to the reading end i of the CPU52. The reading end i of the CPU52 includes pin 1, pin 2, pin 3, pin 4, pin 5, pin 6, and pin 7. The pin 22, pin 23, pin 24, and pin 28 of chip U3 are the first end of the first card-reading processor. Pin 30 of the chip U3 is the input end p of the first card-reading processor and is connected to pin 16 of the card holder ICC2. Pin 29 of the chip U3 is the control end r of the first card-reading processor and is used to connect to the output end n of the CPU52, that is, pin 8 of the CPU52. Pin 2 of the chip U3 is connected to the power source VDD through a resistor R6, pin 4 of the chip U3 is connected to the power source VDD, pin 5 of the chip U3 is connected to the power source VDD through a resistor R7, and a capacitor C7 is connected between the power source VDD and the ground wire GND. Pin 6 and pin 11 of the chip U3 are connected to the ground wire GND. Pin 13, pin 21, pin 26, pin 27, pin 31, and pin 32 are left empty, pin 14 is connected to the ground wire GND through a capacitor C8. Pin 15 of the chip U3 is connected to pin 20 of the chip U3 through a capacitor C9. Pin 16, pin 33, and pin 25 of the chip U3 are connected to the ground wire GND. Pin 17 of the chip U3 is connected to pin 19 through a capacitor C10, pin 18 is connected to the power source VDD through an inductor L2, and a capacitor C11 is connected between the inductor L2 and the ground wire GND.

The chip U4 is the second card-reading processor. Wherein, pin 1, pin 3, pin 7, pin 8, pin 9, pin 10, and pin 12 of the chip U4 are the second end of the second card-reading processor, and used to connect to the reading end i of the CPU52. The reading end i of the CPU52 includes pin 1, pin 2, pin 3, pin 4, pin 5, pin 6, and pin 7 of the CPU52. Pin 22, pin 23, pin 24, and pin 28 of the chip U4 are the first end of the second card-reading processor. Pin 30 of the chip U4 is the input end q of the second card-reading processor and is connected to pin 16 of the card holder ICC2. Pin 29 of the chip U4 is the control end s of the second card-reading processor and is used to connect to the output end n of the CPU52, that is, pin 8 of the CPU52. Pin 2 of the chip U4 is connected to the power source VDD through a resistor R8, pin 4 of the chip U4 is connected to the power source VDD, pin 5 of the chip U4 is connected to the power source VDD through a resistor R9, and a capacitor C12 is connected between the power source VDD and the ground wire GND. Pin 6 and pin 11 of the chip U4 are connected to the ground wire GND. Pin 13, pin 21, pin 26, pin 27, pin 31, and pin 32 are left empty. Pin 14 is connected to the ground wire GND through a capacitor C13. Pin 15 of the chip U4 is connected to pin 20 of the chip U4 through a capacitor C14. Pin 16, pin 33, and pin 25 of the chip U4 are connected to the ground wire GND. Pin 17 of the chip U4 is connected to pin 19 through a capacitor C15, pin 18 is connected to power source VDD through an inductor L3, and a capacitor C16 is connected between the inductor L3 and ground wire GND.

The level conversion module 340 includes: a first resistor R1, a second resistor R2, and a first transistor Q1. A first end of the first resistor R1 is the first end t of the level conversion module 340 and is used to connect to the output end n of the CPU 52, that is, to connect to pin 8 of the CPU 52. A second end of the first resistor R1 is connected to a base of the first transistor Q1. A first end of the second resistor R2 is the third end x of the level conversion module 340, which is used to connect to the power source VDD. A second end of the second resistor R2 is the second end v of the level conversion module 340, and is connected to the control end s of the second card-reader processor (i.e., pin 29 of the chip U4) and a collector of the first transistor Q1. An emitter of the first transistor Q1 is the fourth end y of the level conversion module 340 and is connected to the ground wire GND.

The working principle of the level conversion module 340 is explained: the first transistor Q1 is a P-type transistor with a high level conduction. Take the first level signal as a high level signal and the second level signal as a low level signal as an example. When pin 8 of the CPU 52 outputs the first level signal, the first transistor Q1 is turned on. At this time, the second end v of the level conversion module 340, that is, the second end of the resistor R2, is actually connected to the ground wire GND, therefore, the second end v of the level conversion module 340 is a low level signal, that is, the second level signal. When pin 8 of the CPU 52 outputs the second level signal, the first transistor Q1 is turned off. At this time, the second end v of the level conversion module 340, that is, the second end of the resistor R2, is actually connected to the power source VDD, therefore, the second end v of the level conversion module 340 is a high level signal, that is, the first level signal.

When the card reader 40 is working, the integrated circuit card 10 is inserted into the card slot 402. At this time, the card 12 triggers the detection module 330, that is, the detection module 330 contacts the card 12, and pin 16 of the card holder ICC2 outputs the insertion detection signal to pin 30 of the chip U3 and pin 30 of the chip U4. One of the chip U3 and the chip U4 is working. After the chip U3 and the chip U4 (whichever one is working) receive the insertion detection signal, outputting the indication signal to the CPU 52 through one or more of pin 1, pin 3, pin 7, pin 8, pin 9, pin 10, and pin 12. When the CPU52 receives the instruction signal, first outputting the first level signal through pin 8 of the CPU52. At this time, pin 29 of the chip U3 inputs with the first level signal, and the chip U3 works. Pin 29 of the chip U4 inputs with the second level signal, and chip U4 does not work.

Starting from when pin 8 of the CPU 52 outputs the first level signal, the CPU 52 outputs a read signal to the chip U3 and the chip U4 through one or more of pin 1, pin 2, pin 3, pin 4, pin 5, pin 6, and pin 7.

At this time, if the integrated circuit chip 14 is attached to the first board surface 410 when the integrated circuit card 10 is inserted into the card slot 402, the chip U3 can communicate with the integrated circuit chip 14 and obtain the communication signal after receiving the read signal. After the chip U3 outputs the communication signal to the CPU 52, the CPU 52 can complete reading the integrated circuit chip 14. The task is over.

If the integrated circuit chip 14 is attached to the second board surface 420 when the integrated circuit card 10 is inserted into the card slot 402, the chip U3 cannot communicate with the integrated circuit chip 14 and cannot obtain the communication signal after receiving the read signal, the CPU 52 cannot read the integrated circuit chip 14. If the CPU 52 does not read the integrated circuit chip 14 within a preset time period (such as 3 seconds), pin 8 of the CPU 52 outputs the second level signal. At this time, pin 29 of the chip U3 inputs with the second level signal, and the chip U3 does not work, pin 29 of the chip U4 inputs with the first level signal, and the chip U4 works. Thus, after receiving the read signal, the chip U4 can communicate with the integrated circuit chip 14 and obtain the communication signal. After the chip U4 outputs the communication signal to the CPU52, the CPU52 can complete reading the integrated circuit chip 14. The task is over. It can be seen that the card reader 40 can not only perform double-sided card reading on the integrated circuit card 10 whose card 12 is made of plastic material, but also can perform double-sided card reading on the integrated circuit card 10 whose card 12 is made of metal material.

In the above embodiment, when receiving the instruction signal, the CPU 52 first outputs the first level signal, if the integrated circuit chip 14 is read within the preset time period, the task ends. If the integrated circuit chip 14 is not read within the preset time period, outputting the second level signal. In some other embodiments, when receiving the instruction signal, the CPU 52 may also first outputs the second level signal, if the integrated circuit chip 14 is read within the preset time period, the task ends. If the integrated circuit chip 14 is not read within the preset time period, outputting the first level signal.

In the embodiment of the present application, when the first communication control unit 322 works and the CPU 52 reads the integrated circuit chip 14 through the first connection unit 312, since the second communication control unit 324 does not work, the metal card 12 is disconnected from the reading end i of the CPU 52, so that the metal card 12 will not cause a short circuit between the terminals of the first end of the first connection unit 312. On the contrary, when the second communication control unit 324 works and the CPU 52 reads the integrated circuit chip 14 through the second connection unit 314, since the first communication control unit 322 does not work, the metal card 12 is disconnected from the reading end i of the CPU 52, so that the metal card 12 will not cause a short circuit between the terminals of the first end of the second connection unit 314. Thus, the card reader 40 used in the card-reading circuit 30 can realize double-sided card reading of the integrated circuit card 10 whose card 12 is made of metal material.

The embodiment of the present application also provides a card reader 40, including the card holder and the card-reading circuit 30 as in any of the above embodiments.

In detail, the card holder includes the first board surface 410 and the second board surface 420. The first board surface 410 and the second board surface 420 clamp to form the card slot 402 for inserting the integrated circuit card 10. The first end of the first connection unit 312 is located on the first board surface 410, and the first end of the second connection unit 314 is located on the second board surface 420, so that when the integrated circuit card 10 is inserted into the card slot 402, the integrated circuit chip 14 of the integrated circuit card 10 is connected to the first end of the first connection unit 312 or the first end of the second connection unit 314.

The card-reading circuit 30 includes the connection module 310 and the communication control module 320. The connection module 310 includes the first connection unit 312 and the second connection unit 314, the first end of the first connection unit 312 and the first end of the second connection unit 314 are both used to connect to the integrated circuit chip 14 of the integrated circuit card 10. The communication control module 320 includes the first communication control unit 322 and the second communication control unit 324. The first end of the first communication control unit 322 is connected to the second end of the first connection unit 312, the first end of the second communication control unit 324 is connected to the second end of the second connection unit 314, the second end of the first communication control unit 322 and the second end of the second communication control unit 324 are both used to connect to the reading end of the CPU 52. Thus, when the first communication control unit 322 works, the CPU 52 reads the integrated circuit chip 14 through the first connection unit 312, or when the second communication control unit 324 works, the CPU 52 reads the integrated circuit chip 14 through the second connection unit 314. Wherein, at the same time, one of the first communication control unit 322 and the second communication control unit 324 is working.

In some embodiments, the first communication control unit 322 may include the first switch, the second communication control unit 324 may include the second switch, the first end of the first switch is connected to the second end of the first connection unit 312, the first end of the second switch is connected to the second end of the second connection unit 314, and the second end of the first switch and the second end of the second switch are both used to connect to the reading end of CPU52. Wherein, at the same moment, one of the first switch and the second switch is turned on.

In some embodiments, the communication control module 320 further includes: the card-reading processor 326.

The first end of the card-reading processor 326 is connected to the second end of the first switch and the second end of the second switch, the second end of the card-reading processor 326 is used to connect to the reading end of the CPU 52. The card-reading processor 326 is used to communicate with the integrated circuit chip 14 after receiving the reading signal outputted by the reading end of the CPU 52, obtain the communication signal, and output the communication signal to the reading end of the CPU 52.

In some embodiments, the card-reading circuit 30 further includes: the detection module 330.

The detection module 330 is used to generate the insertion detection signal upon contacting with the card 12 of the integrated circuit card 10, the detection module 330 is connected to the input end of the card-reading processor 326 to transmit the insertion detection signal to the card-reading processor 326.

The card-reading processor 326 is used to transmit the instruction signal to the CPU 52 when receiving the insertion detection signal, and the instruction signal is used to instruct the CPU 52 to output the first level signal or the second level signal. The first level signal is used to control the first switch to be turned on and the second switch to be turned off, and the second level signal is used to control the first switch to be turned off and the second switch to be turned on.

In some embodiments, the first communication control unit 322 includes the first card-reading processor, and the second communication control unit 324 includes the second card-reading processor.

The first end of the first card-reading processor is connected to the second end of the first connection unit 312, and the first end of the second card-reading processor is connected to the second end of the second connection unit 314, the second end of the first card-reading processor and the second end of the second card-reading processor are both used to connect to the reading end of the CPU 52. Wherein, at the same time, one of the first card-reading processor and the second card-reading processor is working.

In some embodiments, the card-reading circuit 30 further includes: the detection module 330.

The detection module 330 is used to generate the insertion detection signal upon contacting with the card 12 of the integrated circuit card 10, the detection module 330 is connected to the input end of the first card-reading processor and the input end of the second card-reading processor to transmit the insertion detection signal to the first card-reading processor and the second card-reading processor.

The first card-reading processor and the second card-reading processor are both used to transmit the indication signal to the CPU 52 when receiving the insertion detection signal, and the indication signal is used to instruct the CPU 52 to output the first level signal or the second level signal. The first level signal is used to control the first card-reading processor to work and control the second card-reading processor not to work. The second level signal is used to control the first card-reading processor not to work and to control the second card-reading processor to work.

In some embodiments, the card-reading circuit 30 further includes: the level conversion module 340.

The first end of the level conversion module 340 is used to connect to the output end of the CPU 52, and the output end of the CPU 52 is connected to the control end of the first card-reading processor, the second end of the level conversion module 340 is connected to the control end of the second card-reading processor, the third end of the level conversion module 340 is connected to the power source, the fourth end of the level conversion module 340 is connected to the ground wire.

When the first end of the level conversion module 340 is inputted with the first level signal, the second end of the level conversion module 340 outputs the second level signal. When the first end of the level conversion module 340 is inputted with the second level signal, the second end of the level conversion module 340 outputs the first level signal.

In some embodiments, the level conversion module 340 includes: the first resistor, the second resistor, and the first transistor.

The first end of the first resistor is used to connect to the output end of the CPU 52, the second end of the first resistor is connected to the base of the first transistor. The first end of the second resistor is used to connect to the power source, the second end of the second resistor is connected to the control end of the second card-reader processor and the collector of the first transistor. The emitter of the first transistor is connected to the ground wire.

In the embodiment of the present application, when the first communication control unit 322 works and the CPU 52 reads the integrated circuit chip 14 through the first connection unit 312, since the second communication control unit 324 does not work, the card 12 is disconnected from the reading end of the CPU 52. In this case, even if the card 12 is made of metal material, the metal card 12 will not cause a short circuit between the terminals of the first end of the first connection unit 312. On the contrary, when the second communication control unit 324 works and the CPU 52 reads the integrated circuit chip 14 through the second connection unit 314, since the first communication control unit 322 does not work, the card 12 is disconnected from the reading end of the CPU 52. In this case, even if the card 12 is made of metal material, the metal card 12 will not cause a short circuit between the terminals of the first end of the second connection unit 314. Thus, the card reader 40 used in the card-reading circuit 30 can realize double-sided card reading of the integrated circuit card 10 whose card 12 is made of plastic material, and also realize double-sided card reading of the integrated circuit card 10 whose card 12 is made of metal material.

The embodiment of the present application also provides a card-reading system, including the CPU 52 and the card-reading circuit 30 as in any of the above embodiments.

Wherein, the CPU 52 is used to: output the first level signal to the control end of the first communication control unit 322 and the control end of the second communication control unit 324 to control one of the first communication control unit 322 and the second communication control unit 324 to work; if the CPU 52 does not read the integrated circuit chip 14 within the preset time period after outputting the first level signal, outputting the second level signal to the control end of the first communication control unit 322 and the control end of the second communication control unit 324, to control the other one of the first communication control unit 322 and the second communication control unit 324 to work. The first level signal may be one of the high level signal and the low level signal, and the second level signal may be the other of the high level signal and the low level signal.

In the embodiment of the present application, when the first communication control unit 322 works and the CPU 52 reads the integrated circuit chip 14 through the first connection unit 312, since the second communication control unit 324 does not work, the card 12 is disconnected from the reading end of the CPU 52. In this case, even if the card 12 is made of metal material, the metal card 12 will not cause a short circuit between the terminals of the first end of the first connection unit 312. On the contrary, when the second communication control unit 324 works and the CPU 52 reads the integrated circuit chip 14 through the second connection unit 314, since the first communication control unit 322 does not work, the card 12 is disconnected from the reading end of the CPU 52. In this case, even if the card 12 is made of metal material, the metal card 12 will not cause a short circuit between the terminals of the first end of the second connection unit 314. Thus, the card reader 40 used in the card-reading circuit 30 can realize double-sided card reading of the integrated circuit card 10 whose card 12 is made of plastic material, and also realize double-sided card reading of the integrated circuit card 10 whose card 12 is made of metal material.

Those skilled in the art should understand that the above description and the embodiments of the present disclosure shown in the drawings are only examples and do not limit the present disclosure. The purpose of the present disclosure has been completely and effectively achieved. The functions and structural principles of the present disclosure have been shown and explained in the embodiments. Without departing from the principles, the implementation of the present disclosure may have any deformation or modification.

What is claimed is:

1. A card-reading circuit comprising: a connection module and a communication control module;
the connection module comprising a first connection unit and a second connection unit, a first end of the first connection unit and a first end of the second connection unit both configured to connect to an integrated circuit chip of an integrated circuit card;
the communication control module comprising a first communication control unit and a second communication control unit, a first end of the first communication control unit connected to a second end of the first connection unit, a first end of the second communication control unit connected to a second end of the second connection unit, a second end of the first communication control unit and a second end of the second communication control unit both connect to a reading end of a central processing unit (CPU), when the first communication control unit is working, the CPU reading the integrated circuit chip through the first connection unit, or when the second communication control unit is working, the CPU reading the integrated circuit chip through the second connection unit; wherein, at the same moment, one of the first communication control unit and the second communication control unit works.

2. The card-reading circuit according to claim 1, wherein the first communication control unit comprises a first switch, the second communication control unit comprises a second switch, a first end of the first switch is connected to the second end of the first connection unit, a first end of the second switch is connected to the second end of the second connection unit, a second end of the first switch and a second end of the second switch are both connected to the reading end of the CPU; wherein, at the same moment, one of the first switch and the second switch is turned on.

3. The card-reading circuit according to claim 2, wherein the communication control module further comprises: a card-reading processor;
a first end of the card-reading processor is connected to the second end of the first switch and the second end of the second switch, a second end of the card-reading processor is connected to the reading end of the CPU, the card-reading processor is configured to communicate with the integrated circuit chip after receiving a reading signal outputted by the reading end of the CPU, obtain a communication signal and output the communication signal to the reading end of the CPU.

4. The card-reading circuit according to claim 3, further comprising a detection module, wherein
the detection module is configured to generate an insertion detection signal upon contacting with a card of the integrated circuit card, the detection module is connected to an input end of the card-reading processor to transmit the insertion detection signal to the card-reading processor;
the card-reading processor is configured to transmit an instruction signal to the CPU when receiving the insertion detection signal, the instruction signal is configured to instruct the CPU to output a first level signal or a second level signal, the first level signal is configured to control the first switch to be turned on and the second switch to be turned off, and the second level signal is configured to control the first switch to be turned off and the second switch to be turned on.

5. The card-reading circuit according to claim 1, wherein the first communication control unit comprises a first card-reading processor, and the second communication control unit comprises a second card-reading processor;
a first end of the first card-reading processor is connected to the second end of the first connection unit, a first end of the second card-reading processor is connected to the second end of the second connection unit, a second end of the first card-reading processor and a second end of the second card-reading processor are both connected to the reading end of the CPU; at the same time, one of the first card-reading processor and the second card-reading processor is working.

6. The card-reading circuit according to claim 5, further comprising a detection module, wherein
the detection module is configured to generate the insertion detection signal upon contacting with the card of the integrated circuit card, the detection module is connected to an input end of the first card-reading processor and an input end of the second card-reading processor to transmit the insertion detection signal to the first card-reading processor and the second card-reading processor;
the first card-reading processor and the second card-reading processor are both configured to transmit an indication signal to the CPU when receiving the insertion detection signal, and the indication signal is configured to instruct the CPU to output a first level signal or a second level signal, the first level signal is configured to control the first card-reading processor to work and control the second card-reading processor not to work; the second level signal is configured to control the first card-reading processor not to work and to control the second card-reading processor to work.

7. The card-reading circuit according to claim 6, further comprising a level conversion module, wherein
a first end of the level conversion module is connected to an output end of the CPU, and the output end of the CPU is connected to a control end of the first card-reading processor, a second end of the level conversion module is connected to a control end of the second card-reading processor, a third end of the level conversion module is connected to a power source, a fourth end of the level conversion module is connected to a ground wire;
when the first end of the level conversion module is inputted with the first level signal, the second end of the level conversion module outputs the second level signal; when the first end of the level conversion module is inputted with the second level signal, the second end of the level conversion module outputs the first level signal.

8. The card-reading circuit according to claim 7, wherein the level conversion module comprises: a first resistor, a second resistor, and a first transistor;
a first end of the first resistor is connected to the output end of the CPU, a second end of the first resistor is connected to a base of the first transistor;
a first end of the second resistor is connected to the power source, a second end of the second resistor is connected to the control end of the second card-reader processor and a collector of the first transistor;
an emitter of the first transistor is connected to the ground wire.

9. A card reader comprising a card holder and a card-reading circuit; wherein
the card-reading circuit comprises a connection module and a communication control module;
the connection module comprises a first connection unit and a second connection unit, a first end of the first connection unit and a first end of the second connection unit are both configured to connect to an integrated circuit chip of an integrated circuit card;
the communication control module comprises a first communication control unit and a second communication control unit, a first end of the first communication control unit connected to a second end of the first connection unit, a first end of the second communication control unit is connected to a second end of the second connection unit, a second end of the first communication control unit and a second end of the second communication control unit are both connect to a reading end of a central processing unit (CPU), when the first communication control unit is working, the CPU reads the integrated circuit chip through the first connection unit, or when the second communication control unit is working, the CPU reads the integrated circuit chip through the second connection unit; wherein, at the same moment, one of the first communication control unit and the second communication control unit works;
the card holder comprises a first board surface and a second board surface, the first board surface and the second board surface clamp to form a card slot for inserting the integrated circuit card, the first end of the first connection unit is located on the first board surface, and the first end of the second connection unit is located on the second board surface, so that when the integrated circuit card is inserted into the card slot, the integrated circuit chip of the integrated circuit card is connected to the first end of the first connection unit or the first end of the second connection unit.

10. A card-reading system comprising a central processing unit (CPU) and a card-reading circuit; wherein the card-reading circuit comprises a connection module and a communication control module;

the connection module comprises a first connection unit and a second connection unit, a first end of the first connection unit and a first end of the second connection unit are both configured to connect to an integrated circuit chip of an integrated circuit card;

the communication control module comprises a first communication control unit and a second communication control unit, a first end of the first communication control unit connected to a second end of the first connection unit, a first end of the second communication control unit is connected to a second end of the second connection unit, a second end of the first communication control unit and a second end of the second communication control unit are both connect to a reading end of a central processing unit (CPU), when the first communication control unit is working, the CPU reads the integrated circuit chip through the first connection unit, or when the second communication control unit is working, the CPU reads the integrated circuit chip through the second connection unit; wherein, at the same moment, one of the first communication control unit and the second communication control unit works;

the CPU is configured to: output a first level signal to a control end of the first communication control unit and a control end of the second communication control unit to control one of the first communication control unit and the second communication control unit to work; if the CPU does not read the integrated circuit chip within a preset time period after outputting the first level signal, outputting a second level signal to the control end of the first communication control unit and the control end of the second communication control unit, to control the other one of the first communication control unit and the second communication control unit to work.

11. The card reader according to claim 9, wherein the first communication control unit comprises a first switch, the second communication control unit comprises a second switch, a first end of the first switch is connected to the second end of the first connection unit, a first end of the second switch is connected to the second end of the second connection unit, a second end of the first switch and a second end of the second switch are both connected to the reading end of the CPU; wherein, at the same moment, one of the first switch and the second switch is turned on.

12. The card reader according to claim 11, wherein the communication control module further comprises: a card-reading processor;

a first end of the card-reading processor is connected to the second end of the first switch and the second end of the second switch, a second end of the card-reading processor is connected to the reading end of the CPU, the card-reading processor is configured to communicate with the integrated circuit chip after receiving a reading signal outputted by the reading end of the CPU, obtain a communication signal and output the communication signal to the reading end of the CPU.

13. The card reader according to claim 12, wherein the card-reading circuit further comprises a detection module, the detection module is configured to generate an insertion detection signal upon contacting with a card of the integrated circuit card, the detection module is connected to an input end of the card-reading processor to transmit the insertion detection signal to the card-reading processor;

the card-reading processor is configured to transmit an instruction signal to the CPU when receiving the insertion detection signal, the instruction signal is configured to instruct the CPU to output a first level signal or a second level signal, the first level signal is configured to control the first switch to be turned on and the second switch to be turned off, and the second level signal is configured to control the first switch to be turned off and the second switch to be turned on.

14. The card reader according to claim 9, wherein the first communication control unit comprises a first card-reading processor, and the second communication control unit comprises a second card-reading processor;

a first end of the first card-reading processor is connected to the second end of the first connection unit, a first end of the second card-reading processor is connected to the second end of the second connection unit, a second end of the first card-reading processor and a second end of the second card-reading processor are both connected to the reading end of the CPU; at the same time, one of the first card-reading processor and the second card-reading processor is working.

15. The card reader according to claim 14, wherein the card-reading circuit further comprises a detection module, the detection module is configured to generate the insertion detection signal upon contacting with the card of the integrated circuit card, the detection module is connected to an input end of the first card-reading processor and an input end of the second card-reading processor to transmit the insertion detection signal to the first card-reading processor and the second card-reading processor;

the first card-reading processor and the second card-reading processor are both configured to transmit an indication signal to the CPU when receiving the insertion detection signal, and the indication signal is configured to instruct the CPU to output a first level signal or a second level signal, the first level signal is configured to control the first card-reading processor to work and control the second card-reading processor not to work; the second level signal is configured to control the first card-reading processor not to work and to control the second card-reading processor to work.

16. The card reader according to claim 15, wherein the card-reading circuit further comprises a level conversion module, a first end of the level conversion module is connected to an output end of the CPU, and the output end of the CPU is connected to a control end of the first card-reading processor, a second end of the level conversion module is connected to a control end of the second card-reading processor, a third end of the level conversion module is connected to a power source, a fourth end of the level conversion module is connected to a ground wire;

when the first end of the level conversion module is inputted with the first level signal, the second end of the level conversion module outputs the second level signal; when the first end of the level conversion module is inputted with the second level signal, the second end of the level conversion module outputs the first level signal.

17. The card reader according to claim 16, wherein the level conversion module comprises: a first resistor, a second resistor, and a first transistor;
- a first end of the first resistor is connected to the output end of the CPU, a second end of the first resistor is connected to a base of the first transistor;
- a first end of the second resistor is connected to the power source, a second end of the second resistor is connected to the control end of the second card-reader processor and a collector of the first transistor;
- an emitter of the first transistor is connected to the ground wire.

18. The card-reading system according to claim 10, wherein the first communication control unit comprises a first card-reading processor, and the second communication control unit comprises a second card-reading processor;
- a first end of the first card-reading processor is connected to the second end of the first connection unit, a first end of the second card-reading processor is connected to the second end of the second connection unit, a second end of the first card-reading processor and a second end of the second card-reading processor are both connected to the reading end of the CPU; at the same time, one of the first card-reading processor and the second card-reading processor is working.

19. The card-reading system according to claim 18, wherein the card-reading circuit further comprises a detection module,
- the detection module is configured to generate the insertion detection signal upon contacting with the card of the integrated circuit card, the detection module is connected to an input end of the first card-reading processor and an input end of the second card-reading processor to transmit the insertion detection signal to the first card-reading processor and the second card-reading processor;
- the first card-reading processor and the second card-reading processor are both configured to transmit an indication signal to the CPU when receiving the insertion detection signal, and the indication signal is configured to instruct the CPU to output a first level signal or a second level signal, the first level signal is configured to control the first card-reading processor to work and control the second card-reading processor not to work; the second level signal is configured to control the first card-reading processor not to work and to control the second card-reading processor to work.

20. The card-reading system according to claim 19, wherein the card-reading circuit further comprises a level conversion module,
- a first end of the level conversion module is connected to an output end of the CPU, and the output end of the CPU is connected to a control end of the first card-reading processor, a second end of the level conversion module is connected to a control end of the second card-reading processor, a third end of the level conversion module is connected to a power source, a fourth end of the level conversion module is connected to a ground wire;
- when the first end of the level conversion module is inputted with the first level signal, the second end of the level conversion module outputs the second level signal; when the first end of the level conversion module is inputted with the second level signal, the second end of the level conversion module outputs the first level signal.

* * * * *